(12) United States Patent
Fujikura et al.

(10) Patent No.: US 9,721,706 B2
(45) Date of Patent: Aug. 1, 2017

(54) NON-ORIENTED ELECTRICAL STEEL SHEET, MANUFACTURING METHOD THEREOF, LAMINATE FOR MOTOR IRON CORE, AND MANUFACTURING METHOD THEREOF

(75) Inventors: Masahiro Fujikura, Tokyo (JP); Yoshiyuki Ushigami, Tokyo (JP); Tesshu Murakawa, Tokyo (JP); Shinichi Kanao, Tokyo (JP); Makoto Atake, Tokyo (JP); Takeru Ichie, Tokyo (JP); Kojiro Hori, Tokyo (JP); Shinichi Matsui, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 894 days.

(21) Appl. No.: 13/982,691

(22) PCT Filed: Aug. 17, 2012

(86) PCT No.: PCT/JP2012/070909
§ 371 (c)(1),
(2), (4) Date: Jul. 30, 2013

(87) PCT Pub. No.: WO2013/024899
PCT Pub. Date: Feb. 21, 2013

(65) Prior Publication Data
US 2013/0309525 A1 Nov. 21, 2013

(30) Foreign Application Priority Data

Aug. 18, 2011 (JP) .................................. 2011-179066
Aug. 18, 2011 (JP) .................................. 2011-179072

(51) Int. Cl.
| | |
|---|---|
| *H01F 1/01* | (2006.01) |
| *H01F 1/04* | (2006.01) |
| *B32B 15/01* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/16* | (2006.01) |
| *C21D 8/12* | (2006.01) |
| *H01F 41/02* | (2006.01) |
| *C22C 1/02* | (2006.01) |
| *H01F 1/16* | (2006.01) |

(52) U.S. Cl.
CPC .............. *H01F 1/04* (2013.01); *B32B 15/011* (2013.01); *C21D 8/1233* (2013.01); *C21D 8/1272* (2013.01); *C22C 1/02* (2013.01); *C22C 38/004* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *H01F 1/16* (2013.01); *H01F 41/0233* (2013.01); *C21D 2211/004* (2013.01); *Y10T 428/12965* (2015.01)

(58) Field of Classification Search
CPC .................................................. C22C 38/008
See application file for complete search history.

(56) References Cited

U.S. PATENT DOCUMENTS

| | | | |
|---|---|---|---|
| 7,513,959 | B2 | 4/2009 | Takashima et al. |
| 2006/0052572 | A1 | 3/2006 | Hofacker |
| 2006/0124207 | A1 | 6/2006 | Takashima et al. |
| 2011/0056592 | A1 | 3/2011 | Arita et al. |
| 2014/0113159 | A1 | 4/2014 | Fujikura et al. |

FOREIGN PATENT DOCUMENTS

| | | |
|---|---|---|
| EP | 2 278 034 A1 | 1/2011 |
| EP | 2 746 415 A1 | 6/2014 |
| JP | 2-8346 A | 1/1990 |
| JP | 6-330255 A | 11/1994 |
| JP | 10-18005 A | 1/1998 |
| JP | 10-88298 A | 4/1998 |
| JP | 11-229094 A | 8/1999 |
| JP | 2004-84083 A | 3/2004 |

(Continued)

OTHER PUBLICATIONS

Machine translation of JP 2006-199999 (Japanese document published Aug. 3, 2006.*
International Search Report Issued in PCT/JP2012/070909, mailed on Nov. 13, 2012.
International Preliminary Report on Patentability dated Feb. 27, 2014 (Forms PCT/IB/338, PCT/IB/373 and PCT/ISA/237) issued in PCT/JP2012/070909.
Extended European Search Report, dated Apr. 7, 2015, for European Application No. 12824065.2.

*Primary Examiner* — Jessee Roe
*Assistant Examiner* — Christopher Kessler
(74) *Attorney, Agent, or Firm* — Birch, Stewart, Kolasch & Birch, LLP

(57) ABSTRACT

A value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively. A matrix of a metal structure is a ferrite phase, and the metal structure does not contain a non-recrystallized structure. An average grain size of ferrite grains constituting the ferrite phase is not less than 30 μm nor more than 200 μm. A precipitate containing at least one selected from the group consisting of Ti, V, Zr, and Nb exists with a density of 1 particle/μm³ or more in the ferrite grain. An average grain size of the precipitate is not less than 0.002 μm nor more than 0.2 μm.

12 Claims, 1 Drawing Sheet

(56) References Cited

FOREIGN PATENT DOCUMENTS

| | | |
|---|---|---|
| JP | 2004-183066 A | 7/2004 |
| JP | 2005-256019 A | 9/2005 |
| JP | 2005-264315 A | 9/2005 |
| JP | 2006-9048 A | 1/2006 |
| JP | 2006-70269 A | 3/2006 |
| JP | 2006-199999 A | 8/2006 |
| JP | 2006-219692 A | 8/2006 |
| JP | 2007-39754 A | 2/2007 |
| WO | WO 2009/128428 A1 | 10/2009 |
| WO | WO 2013/024894 A1 | 2/2013 |

* cited by examiner

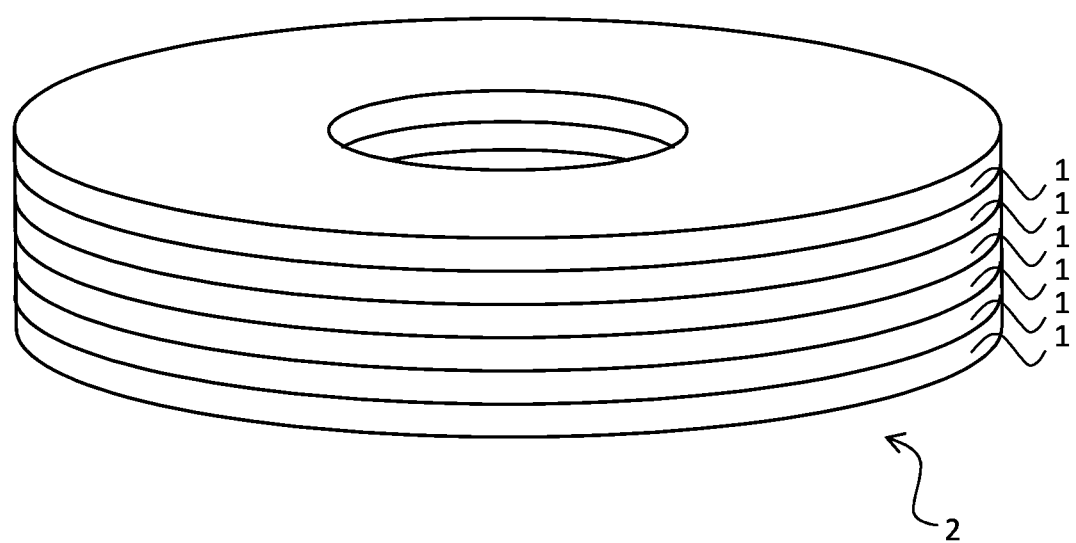

NON-ORIENTED ELECTRICAL STEEL SHEET, MANUFACTURING METHOD THEREOF, LAMINATE FOR MOTOR IRON CORE, AND MANUFACTURING METHOD THEREOF

TECHNICAL FIELD

The present invention relates to a non-oriented electrical steel sheet suitable for an iron core material of an electric apparatus, a manufacturing method thereof, and so on.

BACKGROUND ART

In recent years, as a driving motor of an electric vehicle, a hybrid vehicle, and the like, a motor rotating at a high speed and having a relatively large capacity is increasingly used. For this reason, an iron core material to be used for a driving motor is required to have achievement of low core loss in a range of several hundred Hz to several kHz, which is higher than a commercial frequency. Further, an iron core to be used for a rotor is also required to have required mechanical strength in order to withstand a centrifugal force and stress variation. An iron core material to be used for other than a driving motor of a vehicle sometimes needs to have such a requirement.

Conventionally, techniques have been proposed in order to achieve core loss reduction and/or strength improvement (Patent Literatures 1 to 12).

However, with these techniques, it is difficult to attain achievement of the core loss reduction and the strength improvement. Further, in actuality, some of the techniques have difficulty in manufacturing a non-oriented electrical steel sheet.

CITATION LIST

Patent Literature

Patent Literature 1: Japanese Laid-open Patent Publication No. 02-008346
Patent Literature 2: Japanese Laid-open Patent Publication No. 06-330255
Patent Literature 3: Japanese Laid-open Patent Publication No. 2006-009048
Patent Literature 4: Japanese Laid-open Patent Publication No. 2006-070269
Patent Literature 5: Japanese Laid-open Patent Publication No. 10-018005
Patent Literature 6: Japanese Laid-open Patent Publication No. 2004-084053
Patent Literature 7: Japanese Laid-open Patent Publication No. 2004-183066
Patent Literature 8: Japanese Laid-open Patent Publication No. 2007-039754
Patent Literature 9: International Publication Pamphlet No. WO2009/128428
Patent Literature 10: Japanese Laid-open Patent Publication No. 10-88298
Patent Literature 11: Japanese Laid-open Patent Publication No. 2005-256019
Patent Literature 12: Japanese Laid-open Patent Publication No. 11-229094

SUMMARY OF INVENTION

Technical Problem

The present invention has an object to provide a non-oriented electrical steel sheet capable of attaining achievement of core loss reduction and strength improvement, a manufacturing method thereof, and so on.

Solution to Problem

The present invention has been made in order to solve the above-described problems, and the gist thereof is as follows.

(1) A non-oriented electrical steel sheet containing: in mass %,

C: not less than 0.002% nor more than 0.01%;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities,
wherein
a value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively,
a matrix of a metal structure is a ferrite phase,
the metal structure does not include a non-recrystallized structure,
an average grain size of ferrite grains constituting the ferrite phase is not less than 30 μm nor more than 200 μm,
a precipitate containing at least one selected from the group consisting of Ti, V, Zr, and Nb exists with a density of 1 particle/μm$^3$ or more in the ferrite grain, and
an average grain size of the precipitate is not less than 0.002 μm nor more than 0.2 μm.

(2) The non-oriented electrical steel sheet according to (1), further containing at least one selected from the group consisting of: in mass %, N: not less than 0.001% nor more than 0.004%;
Cu: not less than 0.5% nor more than 1.5%; and
Sn: not less than 0.05% nor more than 0.5%.

(3) The non-oriented electrical steel sheet according to (1) or (2), wherein the precipitate is at least one selected from the group consisting of carbide, nitride, and carbonitride.

(4) A manufacturing method of a non-oriented electrical steel sheet including:

performing hot rolling of a slab to obtain a hot-rolled steel sheet;
performing cold rolling of the hot-rolled steel sheet to obtain a cold-rolled steel sheet; and
performing finish annealing of the cold-rolled steel sheet under a condition in which a soaking temperature is not lower than 950° C. nor higher than 1100° C., a soaking time period is 20 seconds or longer, and an average cooling rate from the soaking temperature to 700° C. is not less than 2° C./sec nor more than 60° C./sec,
wherein
the slab contains: in mass %,
C: not less than 0.002% nor more than 0.01%;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities, and
a value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively.

(5) The manufacturing method of the non-oriented electrical steel sheet according to (4),
wherein the slab further contains at least one selected from the group consisting of: in mass %,
N: not less than 0.001% nor more than 0.004%;
Cu: not less than 0.5% nor more than 1.5%; and
Sn: not less than 0.05% nor more than 0.5%.

(6) The manufacturing method of the non-oriented electrical steel sheet according to (4) or (5), further including, before the performing cold rolling, performing hot-rolled sheet annealing of the hot-rolled steel sheet.

(7) A manufacturing method of a non-oriented electrical steel sheet including:
performing hot rolling of a slab to obtain a hot-rolled steel sheet;
performing cold rolling of the hot-rolled steel sheet to obtain a cold-rolled steel sheet;
performing cold-rolled sheet annealing of the cold-rolled steel sheet under a condition in which a first soaking temperature is not lower than 950° C. nor higher than 1100° C., a soaking time period is 20 seconds or longer, and an average cooling rate from the first soaking temperature to 700° C. is 20° C./sec or more; and
after the cold-rolled sheet annealing, performing finish annealing of the cold-rolled steel sheet under a condition in which a second soaking temperature is not lower than 400° C. nor higher than 800° C., a soaking time period is not shorter than 10 minutes nor longer than 10 hours, and an average cooling rate from the second soaking temperature to 300° C. is not less than 0.0001° C./sec nor more than 0.1° C./sec,
wherein
the slab contains: in mass %,
C: not less than 0.002% nor more than 0.01%;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities, and
a value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively.

(8) The manufacturing method of the non-oriented electrical steel sheet according to (7),
wherein the slab further contains at least one selected from the group consisting of: in mass %,
N: not less than 0.001% nor more than 0.004%;
Cu: not less than 0.5% nor more than 1.5%; and
Sn: not less than 0.05% nor more than 0.5%.

(9) The manufacturing method of the non-oriented electrical steel sheet according to (7) or (8), further including, before the performing cold rolling, performing hot-rolled sheet annealing of the hot-rolled steel sheet.

(10) A laminate for a motor iron core including:
non-oriented electrical steel sheets laminated to one another,
wherein
the non-oriented electrical steel sheets contain: in mass %,
C: not less than 0.002% nor more than 0.01%;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities,
a value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively,
a matrix of a metal structure is a ferrite phase,
the metal structure does not include a non-recrystallized structure,
an average grain size of ferrite grains constituting the ferrite phase is not less than 30 μm nor more than 200 μm,
a precipitate containing at least one selected from the group consisting of Ti, V, Zr, and Nb exists with a density of 1 particle/μm$^3$ or more in the ferrite grain, and
an average grain size of the precipitate is not less than 0.002 μm nor more than 0.2 μm.

(11) The laminate for the motor iron core according to (10), wherein the non-oriented electrical steel sheets further containing at least one selected from the group consisting of: in mass %,
N: not less than 0.001% nor more than 0.004%;
Cu: not less than 0.5% nor more than 1.5%; and
Sn: not less than 0.05% nor more than 0.5%.

(12) The laminate for the motor iron core according to (10) or (11), wherein the precipitate is at least one selected from the group consisting of carbide, nitride, and carbonitride.

(13) A manufacturing method of a laminate for a motor iron core including:
laminating non-oriented electrical steel sheets to one another to obtain a laminate; and
performing annealing on the laminate under a condition in which a soaking temperature is not lower than 400° C. nor higher than 800° C., a soaking time period is not shorter than 2 minutes nor longer than 10 hours, and an average cooling rate from the soaking temperature to 300° C. is not less than 0.0001° C./sec nor more than 0.1° C./sec,
wherein
the non-oriented electrical steel sheets contain: in mass %,
C: not less than 0.002% nor more than 0.01%;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities,
a value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively,
a matrix of a metal structure is a ferrite phase,
the metal structure does not include a non-recrystallized structure,
an average grain size of ferrite grains constituting the ferrite phase is not less than 30 μm nor more than 200 μm,
a precipitate containing at least one selected from the group consisting of Ti, V, Zr, and Nb exists with a density of 1 particle/μm$^3$ or more in the ferrite grain, and
an average grain size of the precipitate is not less than 0.002 μm nor more than 0.2 μm.

(14) The manufacturing method of the laminate for the motor iron core according to (13), wherein the non-oriented electrical steel sheets further contain at least one selected from the group consisting of: in mass %,
  N: not less than 0.001% nor more than 0.004%;
  Cu: not less than 0.5% nor more than 1.5%; and
  Sn: not less than 0.05% nor more than 0.5%.

(15) The manufacturing method of the laminate for the motor iron core according to (13) or (14), wherein the precipitate is at least one selected from the group consisting of carbide, nitride, and carbonitride.

Advantageous Effects of Invention

According to the present invention, the composition and structure of a non-oriented electrical steel sheet are defined appropriately, so that it is possible to attain achievement of core loss reduction and strength improvement.

BRIEF DESCRIPTION OF DRAWINGS

The FIGURE is a schematic view depicting a structure of a laminate for a motor iron core according to an embodiment of the present invention.

DESCRIPTION OF EMBODIMENTS

First, a non-oriented electrical steel sheet according to an embodiment of the present invention and a manufacturing method thereof will be explained.

The non-oriented electrical steel sheet according to the present embodiment has a predetermined composition, a matrix of a metal structure is a ferrite phase, and the metal structure does not contain a non-recrystallized structure. Further, an average grain size of ferrite grains constituting the ferrite phase is not less than 30 μm nor more than 200 μm, a precipitate containing at least one selected from the group consisting of Ti, V, Zr, and Nb exists in the ferrite grain with a density of 1 particle/μm$^3$ or more, and an average grain size of the precipitate is not less than 0.002 μm nor more than 0.2 μm. Such a constitution makes it possible to attain achievement of core loss reduction and strength improvement. As a result, it is possible to greatly contribute to achievement of high efficiency of a motor, and the like.

Further, in a first manufacturing method of the non-oriented electrical steel sheet according to the present embodiment, hot rolling of a slab having a predetermined composition is performed to obtain a hot-rolled steel sheet. Next, cold rolling of the hot-rolled steel sheet is performed to obtain a cold-rolled steel sheet. Next, finish annealing of the cold-rolled steel sheet is performed under a condition in which a soaking temperature is not lower than 950° C. nor higher than 1100° C., a soaking time period is 20 seconds or longer, and an average cooling rate from the above-described soaking temperature to 700° C. is not less than 2° C./sec nor more than 60° C./sec.

Further, in a second manufacturing method of the non-oriented electrical steel sheet according to the present embodiment, hot rolling of a slab having a predetermined composition is performed to obtain a hot-rolled steel sheet. Next, cold rolling of the hot-rolled steel sheet is performed to obtain a cold-rolled steel sheet. Next, cold-rolled sheet annealing of the cold-rolled steel sheet is performed under a condition in which a first soaking temperature is not lower than 950° C. nor higher than 1100° C., a soaking time period is 20 seconds or longer, and an average cooling rate from the first soaking temperature to 700° C. is 20° C./sec or more. Next, after the cold-rolled sheet annealing, finish annealing of the cold-rolled steel sheet is performed under a condition in which a second soaking temperature is not lower than 400° C. nor higher than 800° C., a soaking time period is not shorter than 10 minutes nor longer than 10 hours, and an average cooling rate from the second soaking temperature to 300° C. is not less than 0.0001° C./sec nor more than 0.1° C./sec.

Here, the composition of the non-oriented electrical steel sheet will be explained. Hereinafter, "%" being the unit of a content means "mass %." Further, the composition of the slab is handed over to the non-oriented electrical steel sheet as it is, and thus the composition of the non-oriented electrical steel sheet to be explained here is also a composition of a slab to be used for the manufacture. The non-oriented electrical steel sheet according to the present embodiment contains: for example, C: not less than 0.002% nor more than 0.01%, Si: not less than 2.0% nor more than 4.0%, Mn: not less than 0.05% nor more than 0.5%, and Al: not less than 0.01% nor more than 3.0%, and further contains at least one selected from the group consisting of Ti, V, Zr, and Nb. Further, the balance of the non-oriented electrical steel sheet is composed of Fe and inevitable impurities, and a value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively.

<C: not less than 0.002% nor more than 0.01%>

C forms fine precipitates with Ti, V, Zr, and Nb. The fine precipitate contributes to improvement of strength of steel. When the C content is less than 0.002%, it is not possible to obtain precipitates in an amount sufficient for the improvement of the strength. When the C content is greater than 0.01%, precipitates are likely to precipitate coarsely. The coarse precipitates are not likely to contribute to the improvement of the strength. Further, when precipitates precipitate coarsely, core loss is likely to deteriorate. Thus, the C content is not less than 0.002% nor more than 0.01%. Further, the C content is preferably 0.006% or more, and is also preferably 0.008% or less.

<Si: Not Less than 2.0% Nor More than 4.0%>

Si increases resistivity of steel to reduce core loss. When the Si content is less than 2.0%, it is not possible to obtain the effect sufficiently. When the Si content is greater than 4.0%, steel is brittle to thereby make it difficult to perform rolling.

Thus, the Si content is not less than 2.0% nor more than 4.0%. Further, the Si content is preferably 3.5% or less.

<Mn: Not Less than 0.05% Nor More than 0.5%>

Mn, similarly to Si, increases resistivity of steel to reduce core loss. Further, Mn coarsens sulfide to make it harmless. When the Mn content is less than 0.05%, it is not possible to obtain the effects sufficiently. When the Mn content is greater than 0.5%, a magnetic flux density is likely to decrease and cracking is likely to occur during cold rolling. Further, an increase in cost also is significant. Thus, the Mn content is not less than 0.05% nor more than 0.5%. Further, the Mn content is preferably 0.1% or more, and is also preferably 0.3% or less.

<Al: Not Less than 0.01% Nor More than 3.0%>

Al, similarly to Si, increases resistivity of steel to reduce core loss. Further, Al functions as a deoxidizing material. When the Al content is less than 0.01%, it is not possible to obtain the effects sufficiently. When the Al content is greater than 3.0%, steel is brittle to thereby make it difficult to perform rolling. Thus, the Al content is not less than 0.01% nor more than 3.0%. Further, the Al content is preferably 0.3% or more, and is also preferably 2.0% or less.

<Ti, V, Zr, and Nb>

Ti, V, Zr, and Nb form fine precipitates with C and/or N. The precipitates contribute to improvement of strength of steel. When the value of the parameter Q is less than 0.9, C is excessive with respect to Ti, V, Zr, and Nb, and thus C strongly tends to exist in the steel sheet in a solid solution state after the finish annealing. When C exists in a solid solution state, magnetic aging is likely to occur. When the value of the parameter Q is greater than 1.1, C is insufficient with respect to Ti, V, Zr, and Nb, and thus it is difficult to obtain fine precipitates to thereby make it impossible to obtain the desired strength. Thus, the value of the parameter Q is not less than 0.9 nor more than 1.1. Further, the value of the parameter Q is preferably 0.95 or more, and is also preferably 1.05 or less.

The non-oriented electrical steel sheet according to the present embodiment may further also contain at least one selected from the group consisting of N: not less than 0.001% nor more than 0.004%, Cu: not less than 0.5% nor more than 1.5%, and Sn: not less than 0.05% nor more than 0.5%.

<N: Not Less than 0.001% Nor More than 0.004%>

N, similarly to C, forms fine precipitates with Ti, V, Zr, and Nb. The fine precipitates contribute to improvement of strength of steel. When the N content is less than 0.001%, it is not possible to obtain precipitates in an amount sufficient for further improvement of strength. Thus, the N content is preferably 0.001% or more. When the N content is greater than 0.004%, precipitates are likely to precipitate coarsely. Thus, the N content is 0.004% or less.

<Cu: Not Less than 0.5% Nor More than 1.5%>

The present inventors found out that when Cu is contained in steel, precipitates containing at least one selected from the group consisting of Ti, V, Zr, and Nb are likely to precipitate finely. The fine precipitates contribute to improvement of strength of steel. When the Cu content is less than 0.5%, it is not possible to obtain the effect sufficiently. Thus, the Cu content is preferably 0.5% or more. Further, the Cu content is more preferably 0.8% or more. When the Cu content is greater than 1.5%, steel is likely to be brittle. Thus, the Cu content is 1.5% or less. Further, the Cu content is also preferably 1.2% or less.

The reason why in the case of Cu being contained in steel, the above-described precipitate precipitates finely is unclear, but the present inventors suppose that this is because a local concentration distribution of Cu is generated in a matrix to be a precipitation site of carbide. Thus, it is also acceptable that Cu has not precipitated when the above-described precipitate is made to precipitate. On the other hand, a precipitate of Cu contributes to improvement of strength of a non-oriented electrical steel sheet. Thus, it is also acceptable that Cu has precipitated.

<Sn: Not Less than 0.05% Nor More than 0.5%>

The present inventors also found out that when Sn is contained in steel, precipitates containing at least one selected from the group consisting of Ti, V, Zr, and Nb are likely to precipitate finely. The fine precipitates contribute to improvement of strength of steel. When the Sn content is less than 0.05%, it is not possible to obtain the effect sufficiently. Thus, the Sn content is preferably 0.05% or more. Further, the Sn content is more preferably 0.08% or more. When the Sn content is greater than 0.5%, steel is likely to be brittle. Thus, the Sn content is 0.5% or less. Further, the Sn content is also preferably 0.2% or less.

<Other Components>

Ni of not less than 0.5% nor more than 5% and P of not less than 0.005% nor more than 0.1% may also be contained. Ni and P contribute to solution hardening of the steel sheet, and the like.

Next, the metal structure of the non-oriented electrical steel sheet will be explained.

As described above, the matrix (matrix) of the metal structure of the non-oriented electrical steel sheet according to the present embodiment is a ferrite phase, and the non-recrystallized structure is not contained in the metal structure. This is because the non-recrystallized structure improves the strength but deteriorates core loss significantly. Further, when the average grain size of the ferrite grains constituting the ferrite phase is less than 30 µm, hysteresis loss increases. When the average grain size of the ferrite grains is greater than 200 µm, an effect of fine grain hardening decreases significantly. Thus, the average grain size of the ferrite grains is not less than 30 µm nor more than 200 µm. Further, the average grain size of the ferrite grains is preferably 50 µm or more, and is more preferably 80 µm or more. The average grain size of the ferrite grains is also preferably 100 µm or less.

In the present embodiment, a precipitate containing at least one selected from the group consisting of Ti, V, Zr, and Nb exists in the ferrite grain. As the precipitate is smaller and a number density of the precipitate is higher, high strength can be obtained. Further, the size of the precipitate is important also in terms of magnetic properties. For example, in the case when the diameter of the precipitate is smaller than a thickness of a magnetic domain wall, it is possible to prevent deterioration (increase) of hysteresis loss caused by pinning of domain wall displacement. When the average grain size of the precipitate is greater than 0.2 µm, it is not possible to obtain the effects sufficiently. Thus, the average grain size of the precipitate is 0.2 µm or less. The average grain size is preferably 0.1 µm or less, is more preferably 0.05 µm or less, and is still more preferably 0.01 µm or less.

Incidentally, when a theoretical thickness of a magnetic domain wall of pure iron is estimated in terms of exchange energy and anisotropy energy, it is 0.1 µm or so, but an actual thickness of the magnetic domain wall changes according to the orientation in which the magnetic domain wall is formed. Further, as is an non-oriented electrical steel sheet, in the case when elements other than Fe are contained, the thickness of the magnetic domain wall is also affected by their types, amounts and the like. From the viewpoint as well, it is conceivable that the average grain size of the precipitate, which is 0.2 µm or less, is appropriate.

When the average grain size of the precipitate is less than 0.002 µm (2 nm), an effect of increasing the mechanical strength is saturated. Further, it is difficult to control the average grain size of the precipitate in a range of less than 0.002 µm. Thus, the average grain size of the precipitate is 0.002 µm or more.

Further, as the number density of the precipitate is higher, the high strength can be obtained, and when the number density of the precipitate in the ferrite grain is less than 1 particle/µm$^3$, it is difficult to obtain the desired strength. Therefore, the number density of the precipitate is 1 particle/µm$^3$ or more. The number density is preferably 100 particles/µm$^3$ or more, is more preferably 1000 particles/µm$^3$ or more, is further preferably 10000 particles/µm$^3$ or more, and is still more preferably 100000 particles/µm$^3$ or more.

Next, the manufacturing method of the non-oriented electrical steel sheet will be explained. In the first manufacturing method of the non-oriented electrical steel sheet according to the present embodiment, as described above, the hot rolling of the slab having the predetermined composition is performed to obtain the hot-rolled steel sheet. Next, the cold rolling of the hot-rolled steel sheet is performed to obtain the cold-rolled steel sheet. Next, the finish annealing of the cold-rolled steel sheet is performed under the condition in which the soaking temperature is not lower than 950° C. nor higher than 1100° C., the soaking time period is 20 seconds or longer, and the average cooling rate from the above-described soaking temperature to 700° C. is not less than 2° C./sec nor more than 60° C./sec. Further, in the second manufacturing method, the hot rolling of the slab having the predetermined composition is performed to obtain the hot-rolled steel sheet. Next, the cold rolling of the hot-rolled steel sheet is performed to obtain the cold-rolled steel sheet. Next, the cold-rolled sheet annealing of the cold-rolled steel sheet is performed under the condition in which the first soaking temperature is not lower than 950° C. nor higher than 1100° C., the soaking time period is 20 seconds or longer, and the average cooling rate from the first soaking temperature to 700° C. is 20° C./sec or more. Next, after the cold-rolled sheet annealing, the finish annealing of the cold-rolled steel sheet is performed under the condition in which the second soaking temperature is not lower than 400° C. nor higher than 800° C., the soaking time period is not shorter than 10 minutes nor longer than 10 hours, and the average cooling rate from the second soaking temperature to 300° C. is not less than 0.0001° C./sec nor more than 0.1° C./sec.

First, the first manufacturing method will be explained.

When a slab heating temperature of the hot rolling is lower than 1050° C., the hot rolling is likely to be difficult to be performed. When the slab heating temperature is higher than 1200° C., sulfide and the like are once dissolved and the sulfide and the like precipitate finely in a cooling process of the hot rolling, and thus the growth of the ferrite grains in the finish annealing (the annealing after the cold rolling) is likely to be prevented. Thus, the slab heating temperature is preferably not lower than 1050° C. nor higher than 1200° C.

In the hot rolling, for example, rough rolling and finish rolling are performed. A finish temperature of the finish rolling (finishing temperature) is preferably not lower than 750° C. nor higher than 950° C. This is to obtain high productivity.

The thickness of the hot-rolled steel sheet is not limited in particular. However, it is not easy to set the thickness of the hot-rolled steel sheet to less than 1.6 mm, which also leads to a decrease in productivity. On the other hand, when the thickness of the hot-rolled steel sheet is 2.7 mm, it is sometimes necessary to excessively increase a reduction ratio in the following cold rolling. In the case when the reduction ratio in the cold rolling is high excessively, a texture of a non-oriented electrical steel sheet may deteriorate and magnetic properties (magnetic flux density and core loss) may deteriorate. Thus, the thickness of the hot-rolled steel sheet is preferably not less than 1.6 mm nor more than 2.7 mm.

The cold rolling may be performed only one time, or may also be performed two or more times with intermediate annealing being interposed therebetween. The final reduction ratio in the cold rolling is preferably not less than 60% nor more than 90%. This is to make the metal structure (texture) of the non-oriented electrical steel sheet obtained after the finish annealing better to obtain the high magnetic flux density and the low core loss. Further, in the case of the intermediate annealing being performed, its temperature is preferably not lower than 900° C. nor higher than 1100° C. This is to make the metal structure better. The final reduction ratio is more preferably 65% or more, and is also more preferably 82% or less.

In the finish annealing, in a soaking process, the precipitates containing Ti, V, Zr, and/or Nb that are contained in the cold-rolled steel sheet are made to be once solid-dissolved, and in the following cooling process, the precipitates containing Ti, V, Zr, and/or Nb are made to precipitate finely. When the soaking temperature is lower than 950° C., it is difficult to sufficiently grow the ferrite grains and sufficiently solid-dissolve the precipitates containing Ti, V, Zr, and/or Nb. When the soaking temperature is higher than 1100° C., energy consumption is increased, and incidental facilities such as a hearth roll are likely to be damaged. Thus, the soaking temperature is not lower than 950° C. nor higher than 1100° C. Further, when the soaking time period is shorter than 20 seconds, it is difficult to sufficiently grow the ferrite grains and sufficiently solid-dissolve the precipitates containing Ti, V, Zr, and/or Nb. Thus, the soaking time period is 20 seconds or longer. When the soaking time period is longer than 2 minutes, a decrease in productivity is significant. Thus, the soaking time period is preferably shorter than 2 minutes.

Incidentally, a dissolution temperature of the precipitates containing Ti, V, Zr, and/or Nb is affected by the contents of Ti, V, Zr, Nb, C, and N. For this reason, the temperature of the finish annealing is preferably adjusted according to the contents of Ti, V, Zr, Nb, C, and N. That is, the temperature of the finish annealing is appropriately adjusted, thereby making it possible to obtain the higher mechanical strength (tensile strength).

In the cooling process of the finish annealing, as described above, the precipitates containing Ti, V, Zr, and/or Nb are made to precipitate finely. When the average cooling rate from the soaking temperature to 700° C. is less than 2° C./sec, the precipitates are likely to precipitate coarsely, thereby making it impossible to obtain the sufficient strength. When the average cooling rate is greater than 60° C./sec, it is not possible to make the precipitates containing Ti, V, Zr, and/or Nb precipitate sufficiently and obtain the sufficient strength thereby. Thus, the average cooling rate from the soaking temperature to 700° C. is not less than 2° C./sec nor more than 60° C./sec.

Incidentally, before performing the cold rolling, annealing of the hot-rolled steel sheet, namely hot-rolled sheet annealing may also be performed. The appropriate hot-rolled sheet annealing is performed, thereby making the texture of the non-oriented electrical steel sheet more desirable and making it possible to obtain the more excellent magnetic flux density. In the case when a soaking temperature of the hot-rolled sheet annealing is lower than 850° C., and in the case when a soaking time period is shorter than 30 seconds, it is difficult to make the texture more desirable. In the case when the soaking temperature is higher than 1100° C., and in the case when the soaking time period is longer than 5 minutes, the energy consumption is increased, and the incidental facilities such as a hearth roll are likely to be damaged, and an increase in cost is significant. Thus, in the hot-rolled sheet annealing, the soaking temperature is preferably not lower than 850° C. nor higher than 1100° C. and the soaking time period is preferably not shorter than 30 seconds nor longer than 5 minutes.

In this manner, the non-oriented electrical steel sheet according to the present embodiment can be manufactured. Then, the non-oriented electrical steel sheet manufactured in this manner is provided with the metal structure as described above to be able to obtain the high strength and the low core loss. That is, in the soaking process of the finish annealing, recrystallization is caused and the above-described ferrite phase is generated, and in the following cooling process, the above-described precipitates are generated. Incidentally, after the finish annealing, an insulating film may also be formed according to need.

Next, the second manufacturing method will be explained.

In the second manufacturing method, under the condition similar to that of the first manufacturing method, the hot rolling and the cold rolling are performed. Incidentally, although the reason why in the first manufacturing method the slab heating temperature is 1200° C. or lower is because when the slab heating temperature is higher than 1200° C. as described above, the growth of the ferrite grains in the finish annealing is likely to be prevented, the reason why in the second manufacturing method the slab heating temperature is 1200° C. or lower is because when the slab heating temperature is higher than 1200° C., the growth of the ferrite grains in the cold-rolled sheet annealing (the annealing after the cold rolling) is likely to be prevented. Further, hot-rolled sheet annealing may also be performed under the condition similar to that of the first manufacturing method.

In the cold-rolled sheet annealing, the precipitates containing Ti, V, Zr, and/or Nb that are contained in the cold-rolled steel sheet are made to be solid-dissolved. When the soaking temperature is lower than 950° C., it is difficult to sufficiently grow the ferrite grains and sufficiently solid-dissolve the precipitates containing Ti, V, Zr, and/or Nb. When the soaking temperature is higher than 1100° C., the energy consumption is increased, and the incidental facilities such as a hearth roll are likely to be damaged. Thus, the soaking temperature is not lower than 950° C. nor higher than 1100° C. Further, when the soaking time period is shorter than 20 seconds, it is difficult to sufficiently grow the ferrite grains and sufficiently solid-dissolve the precipitates containing Ti, V, Zr, and/or Nb. When the soaking time period is longer than 2 minutes, a decrease in productivity is significant. Thus, the soaking time period is preferably shorter than 2 minutes.

In the cooling process of the cold-rolled sheet annealing, solid-dissolved Ti, V, Zr, and/or Nb are/is prevented from being precipitated as much as possible and their/its solid-solution states/solid-solution state as they are/as it is are/is maintained. When the average cooling rate from the soaking temperature to 700° C. is less than 20° C./sec, Ti, V, Zr, and/or Nb are/is likely to precipitate in large amounts. Thus, the average cooling rate from the soaking temperature to 700° C. is 20° C./sec or more. The average cooling rate is preferably 60° C./sec or more, and is more preferably 100° C./sec or more.

In the finish annealing, with Ti, V, Zr, and/or Nb that are/is solid-dissolved in the cold-rolled steel sheet obtained after the cold-rolled sheet annealing, precipitates containing Ti, V, Zr, and/or Nb are made to precipitate finely. In the case when the soaking temperature is lower than 400° C., and in the case when the soaking time period is shorter than 10 minutes, it is difficult to make the precipitates containing Ti, V, Zr, and/or Nb precipitate sufficiently. In the case when the soaking temperature is higher than 800° C., and in the case when the soaking time period is longer than 10 hours, the energy consumption is increased, or the incidental facilities such as a hearth roll are likely to be damaged, and an increase in cost is significant. Further, the precipitates precipitate coarsely, thereby making it impossible to obtain the sufficient strength. Thus, the soaking temperature is not lower than 400° C. nor higher than 800° C., and the soaking time period is not longer than 10 minutes nor shorter than 10 hours. Further, the soaking temperature is preferably 500° C. or higher. When the average cooling rate from the soaking temperature to 300° C. is less than 0.0001° C./sec, the precipitates are likely to precipitate coarsely, thereby making it impossible to obtain the sufficient strength. When this average cooling rate is greater than 0.1° C./sec, it is not possible to make the precipitates containing Ti, V, Zr, and/or Nb precipitate sufficiently and obtain the sufficient strength thereby. Thus, the average cooling rate from the soaking temperature to 300° C. is not less than 0.0001° C./sec nor more than 0.1° C./sec.

In this manner, the non-oriented electrical steel sheet according to this embodiment can be manufactured. Then, the non-oriented electrical steel sheet manufactured in this manner is provided with the metal structure as described above to be able to obtain the high strength and the low core loss. That is, in the cold-rolled sheet annealing, recrystallization is caused and the above-described ferrite phase is generated, and in the following finish annealing, the above-described precipitates are generated. Incidentally, after the finish annealing, an insulating film may also be formed according to need.

Incidentally, subsequent to the cooling in the cold-rolled sheet annealing, the finish annealing may also be performed continuously. That is, after the cooling down to 700° C. in the cold-rolled sheet annealing, the finish annealing may also be started in a range of not lower than 400° C. nor higher than 800° C. without cooling down to lower than 400° C.

As above, in each of the first manufacturing method and the second manufacturing method, in the annealing after the cold rolling, the ferrite grains are grown sufficiently, and then the precipitates are made to precipitate. Therefore, it is possible to avoid the growth of crystal grains from being inhibited by the precipitates in advance. Further, it is also possible to make the precipitates precipitate smaller than the thickness of the magnetic domain wall. Thus, it is also possible to suppress the deterioration of the core loss caused by pinning of domain wall displacement.

Next, a laminate for a motor iron core constituted by using the non-oriented electrical steel sheets according to the present embodiment will be explained. The FIGURE is a schematic view depicting a laminate for a motor iron core constituted by using the non-oriented electrical steel sheets according to the present embodiment.

In a laminate 2 for a motor iron core depicted in the FIGURE non-oriented electrical steel sheets 1 according to the embodiment are included. The laminate 2 for a motor iron core can be obtained in a manner that the non-oriented electrical steel sheets 1 are formed into a desired shape by a method such as punching and are laminated to be fixed by a method such as caulking, for example. The non-oriented electrical steel sheets 1 are included, so that of the laminate 2 for a motor iron core, a core loss is low and mechanical strength is high.

It is also possible to complete the laminate 2 for a motor iron core at the time when the fixation as described above is finished. Further, it is also possible that after the above-described fixation, annealing is performed under a condition in which a soaking temperature is not lower than 400° C. nor higher than 800° C., a soaking time period is not shorter than 2 minutes nor longer than 10 hours, and an average cooling rate from the above-described soaking temperature to 300° C. is not less than 0.0001° C. nor more than 0.1° C., and after such annealing is finished, the laminate 2 for a motor iron core is completed. By performing such annealing, precipitates are precipitated, thereby making it possible to further improve the strength.

In the case when the soaking temperature of the annealing is lower than 400° C., and in the case when the soaking time period is shorter than 2 minutes, it is difficult to make the precipitates precipitate sufficiently. In the case when the soaking temperature is higher than 800° C., and in the case when the soaking time period is longer than 10 hours, the energy consumption is increased, or the incidental facilities are likely to be damaged, and an increase in cost is significant. Further, the precipitates may precipitate coarsely to thereby make it difficult to increase the strength sufficiently. Thus, the soaking temperature is preferably not lower than 400° C. nor higher than 800° C., and the soaking time period is preferably not shorter than 2 minutes nor longer than 10 hours. Further, the soaking temperature is more preferably 500° C. or higher, and the soaking time period is more preferably 10 minutes or longer. When the average cooling rate from the soaking temperature to 300° C. is less than 0.0001° C./sec, carbide is likely to precipitate coarsely. When the average cooling rate is greater than 0.1° C./sec, it is difficult to make the precipitates precipitate sufficiently. Thus, the average cooling rate from the soaking temperature to 300° C. is preferably not less than 0.0001° C./sec nor more than 0.1° C./sec.

EXAMPLE

Next, experiments conducted by the present inventors will be explained. Conditions and so on in these experiments are examples employed for confirming the applicability and effects of the present invention, and the present invention is not limited to these examples.

Experimental Example 1

First, steels having various compositions listed in Table 1 were melted by vacuum melting. Then, hot rolling of each of obtained slabs was performed to obtain hot-rolled steel sheets. The thickness of each of the hot-rolled steel sheets (hot-rolled sheets) was set to 2.0 mm. Subsequently, pickling of each of the hot-rolled steel sheets was performed, and cold rolling of each of the hot-rolled steel sheets was performed to obtain cold rolling steel sheets. The thickness of each of the cold-rolled steel sheets (cold-rolled sheets) was set to 0.35 mm. Thereafter, finish annealing of each of the cold-rolled steel sheets was performed. In the finish annealing, a soaking temperature was set to 1000° C., a soaking time period was set to 30 seconds, and an average cooling rate from the soaking temperature (1000° C.) to 700° C. was set to 20° C./sec. In this manner, various non-oriented electrical steel sheets were manufactured. Thereafter, a metal structure of each of the non-oriented electrical steel sheets was observed. In the observation of the metal structure, for example, measurement of a grain size (JIS G 0552) and observation of precipitates were performed. Further, from each of the non-oriented electrical steel sheets, a JIS No. 5 test piece was cut out, and its mechanical property was measured. Further, from each of the non-oriented electrical steel sheets, a test piece of 55 mm×55 mm was cut out, and its magnetic property was measured by a single sheet magnetic property measurement method (JIS C 2556). As the magnetic property, a core loss (W10/400) under a condition of a frequency being 400 Hz and a maximum magnetic flux density being 1.0 T was measured. Further, in order to observe an effect of magnetic aging, the core loss (W10/400) was measured also after an aging treatment at 200° C. for 1 day. That is, with respect to each of the non-oriented electrical steel sheets, the core loss (W10/400) was measured before and after the aging treatment. These results are listed in Table 2.

TABLE 1

| STEEL | COMPOSITION (MASS %) | | | | | | | | | | | PARAMETER |
|---|---|---|---|---|---|---|---|---|---|---|---|---|
| No. | C | Si | Mn | Al | Ti | V | Zr | Nb | N | Cu | Sn | Q |
| A1 | 0.0025 | 2.9 | 0.22 | 0.6 | 0.0010 | 0.0009 | 0.0009 | 0.0150 | — | — | — | 1.01 |
| A2 | 0.0098 | 2.9 | 0.22 | 0.7 | 0.0010 | 0.0009 | 0.0010 | 0.0700 | — | — | — | 0.98 |
| A3 | 0.0100 | 2.1 | 0.2 | 0.7 | 0.0010 | 0.0011 | 0.0010 | 0.0730 | — | — | — | 1.01 |
| A4 | 0.0068 | 3.7 | 0.2 | 0.7 | 0.0010 | 0.0010 | 0.0010 | 0.0490 | — | — | — | 1.02 |
| A5 | 0.0071 | 2.9 | 0.08 | 0.6 | 0.0010 | 0.0010 | 0.0010 | 0.0500 | — | — | — | 1 |
| A6 | 0.0066 | 2.9 | 0.5 | 0.6 | 0.0010 | 0.0010 | 0.0010 | 0.0510 | — | — | — | 1.09 |
| A7 | 0.0072 | 3 | 0.2 | 0.012 | 0.0010 | 0.0010 | 0.0010 | 0.0500 | — | — | — | 0.98 |
| A8 | 0.0062 | 3 | 0.23 | 2.87 | 0.0010 | 0.0008 | 0.0011 | 0.0480 | — | — | — | 1.09 |
| A9 | 0.0063 | 2.9 | 0.23 | 0.6 | 0.0010 | 0.0010 | 0.0010 | 0.0430 | — | — | — | 0.98 |
| A10 | 0.0070 | 2.9 | 0.2 | 0.6 | 0.0009 | 0.0011 | 0.0009 | 0.0550 | — | — | — | 1.1 |
| A11 | 0.0068 | 3.05 | 0.2 | 0.6 | 0.0010 | 0.0010 | 0.0010 | 0.0500 | — | — | — | 1.04 |
| A12 | 0.0064 | 3.05 | 0.2 | 0.6 | 0.0010 | 0.0010 | 0.0480 | 0.0010 | — | — | — | 1.08 |
| A13 | 0.0068 | 3.05 | 0.21 | 0.7 | 0.0010 | 0.0280 | 0.0010 | 0.0010 | — | — | — | 1.04 |
| A14 | 0.0068 | 3.05 | 0.21 | 0.7 | 0.0260 | 0.0010 | 0.0010 | 0.0010 | — | — | — | 1.03 |
| A15 | 0.0065 | 2.9 | 0.2 | 0.7 | 0.0010 | 0.0010 | 0.0010 | 0.0500 | 0.0030 | — | — | 1.09 |
| A16 | 0.0068 | 3 | 0.2 | 0.6 | 0.0010 | 0.0010 | 0.0010 | 0.0490 | — | 0.7000 | — | 1.02 |
| A17 | 0.0067 | 3 | 0.22 | 0.6 | 0.0010 | 0.0009 | 0.0011 | 0.0510 | — | 1.0000 | — | 1.07 |
| A18 | 0.0071 | 3 | 0.22 | 0.7 | 0.0011 | 0.0010 | 0.0010 | 0.0500 | — | 1.4000 | — | 1 |
| A19 | 0.0070 | 2.7 | 0.2 | 0.9 | 0.0010 | 0.0010 | 0.0010 | 0.0500 | — | — | 0.0800 | 1.01 |
| B1 | 0.0009 | 2.9 | 0.2 | 0.6 | 0.0010 | 0.0009 | 0.0010 | 0.0520 | — | — | — | 8.11 |
| B2 | 0.0310 | 2.9 | 0.2 | 0.6 | 0.0011 | 0.0010 | 0.0010 | 0.0100 | — | — | — | 0.06 |
| B3 | 0.0070 | 1.5 | 0.2 | 0.7 | 0.0010 | 0.0010 | 0.0010 | 0.0530 | — | — | — | 1.07 |
| B4 | 0.0070 | 4.4 | 0.2 | 0.7 | 0.0010 | 0.0010 | 0.0010 | 0.0510 | — | — | — | 1.03 |
| B5 | 0.0070 | 2.9 | 0.003 | 0.7 | 0.0010 | 0.0010 | 0.0010 | 0.0520 | — | — | — | 1.05 |
| B6 | 0.0070 | 2.9 | 1 | 0.6 | 0.0010 | 0.0010 | 0.0010 | 0.0500 | — | — | — | 1.01 |
| B7 | 0.0070 | 3 | 0.2 | 0.002 | 0.0011 | 0.0009 | 0.0010 | 0.0510 | — | — | — | 1.03 |
| B8 | 0.0070 | 3 | 0.2 | 3.2 | 0.0011 | 0.0010 | 0.0010 | 0.0510 | — | — | — | 1.03 |

TABLE 2

| | | | METAL STRUCTURE | | | | |
|---|---|---|---|---|---|---|---|
| | | | NON-RECRYS-TALLIZED STRUCTURE AREA RETIO (%) | FERRITE PHASE AVERAGE GRAIN SIZE (μm) | PRECIPITATE | | |
| | CONDITION No. | STEEL No. | | | AVERAGE GRAIN SIZE (μm) | DENSITY (PIECES/μm$^3$) | TYPE OF MAIN PRECIPITATE |
| INVENTIVE EXAMPLE | C1 | A1 | 0 | 110 | 0.004 | 13000 | NbC |
| | C2 | A2 | 0 | 80 | 0.003 | 14000 | NbC |
| | C3 | A3 | 0 | 120 | 0.004 | 12000 | NbC |
| | C4 | A4 | 0 | 90 | 0.005 | 13000 | NbC |
| | C5 | A5 | 0 | 75 | 0.006 | 12000 | NbC |
| | C6 | A6 | 0 | 95 | 0.003 | 17000 | NbC |
| | C7 | A7 | 0 | 75 | 0.005 | 16000 | NbC |
| | C8 | A8 | 0 | 82 | 0.005 | 14000 | NbC |
| | C9 | A9 | 0 | 93 | 0.006 | 14000 | NbC |
| | C10 | A10 | 0 | 89 | 0.005 | 13000 | NbC |
| | C11 | A11 | 0 | 92 | 0.005 | 12000 | NbC |
| | C12 | A12 | 0 | 95 | 0.004 | 14000 | ZrC |
| | C13 | A13 | 0 | 85 | 0.006 | 13000 | VC |
| | C14 | A14 | 0 | 93 | 0.005 | 14000 | TiC |
| | C15 | A15 | 0 | 88 | 0.003 | 21000 | NbC, NbN, Nb(C, N) |
| | C16 | A16 | 0 | 90 | 0.003 | 35000 | NbC |
| | C17 | A17 | 0 | 90 | 0.004 | 48000 | NbC, Cu |
| | C18 | A18 | 0 | 92 | 0.003 | 52000 | NbC, Cu |
| | C19 | A19 | 0 | 97 | 0.004 | 14000 | NbC |
| COMPARATIVE EXAMPLE | D1 | B1 | 95 | 28 | NOT OBSERVED | NOT OBSERVED | NOT OBSERVED |
| | D2 | B2 | 0 | 16 | 0.006 | 15000 | NbC |
| | D3 | B3 | 0 | 85 | 0.006 | 13000 | NbC |
| | D4 | B4 | — | — | — | — | — |
| | D5 | B5 | 0 | 65 | 0.005 | 12000 | NbC |
| | D6 | B6 | — | — | — | — | — |
| | D7 | B7 | 0 | 48 | 0.005 | 14000 | NbC |
| | D8 | B8 | — | — | — | — | — |

| | MECHANICAL PROPERTY TENSILE STRENGTH (MPa) | MAGNETIC PROPERTIES | | REMARKS |
|---|---|---|---|---|
| | | W10/400 BEFORE AGING (W/kg) | W10/400 AFTER AGING (W/kg) | |
| INVENTIVE EXAMPLE | 550 | 18 | 18 | |
| | 600 | 27 | 26 | |
| | 560 | 29 | 29 | |
| | 600 | 23 | 23 | |
| | 565 | 27 | 27 | |
| | 590 | 24 | 25 | |
| | 570 | 28 | 28 | |
| | 605 | 23 | 23 | |
| | 580 | 19 | 19 | |
| | 560 | 21 | 21 | |
| | 570 | 19 | 19 | |
| | 570 | 21 | 21 | |
| | 560 | 21 | 21 | |
| | 560 | 22 | 23 | |
| | 570 | 23 | 23 | |
| | 610 | 22 | 22 | |
| | 660 | 21 | 21 | |
| | 670 | 23 | 23 | |
| | 570 | 20 | 20 | |
| COMPARATIVE EXAMPLE | 660 | 42 | 42 | NON-RECRYSTALLIZED STRUCTURE REMAINED, AND IRON LOSS WAS LARGE. |
| | 630 | 36 | 45 | IRON LOSS DETERIORATED THROUGH AGING. |
| | 510 | 34 | 34 | MECHANICAL STRENGTH WAS POOR. IRON LOSS WAS LARGE. |
| | — | — | — | WORKABILITY WAS POOR AND STEEL BROKE DURING COLD-ROLLING. |
| | 520 | 24 | 24 | MECHANICAL STRENGTH WAS POOR. |
| | — | — | — | WORKABILITY WAS POOR AND STEEL BROKE DURING COLD-ROLLING. |
| | 530 | 33 | 33 | MECHANICAL STRENGTH WAS POOR. |

TABLE 2-continued

| | | | WORKABILITY WAS POOR AND STEEL BROKE DURING COLD-ROLLING. |

As listed in Table 2, in conditions No. C1 to No. C19 each falling within the range of the present invention, it was possible to obtain the tensile strength of 550 MPa or more and the core loss (W10/400) of 30 W/kg or less. On the other hand, in conditions No. D1 to No. D8 each falling outside the range of the present invention, it was difficult to achieve the tensile strength and the core loss.

Experimental Example 2

First, hot rolling of slabs each made of a steel No. A11 listed in Table 1 was performed to obtain hot-rolled steel sheets. The thickness of each of the hot-rolled steel sheets was set to 2.0 mm. Thereafter, annealing (hot-rolled sheet annealing) of a part of the hot-rolled steel sheet (a condition No. E7) was performed under the condition listed in Table 3. Subsequently, pickling of each of the hot-rolled steel sheets was performed, and cold rolling of each of the hot-rolled steel sheets was performed to obtain cold rolling steel sheets. The thickness of each of the cold-rolled steel sheets was set to 0.35 mm. Then, finish annealing of each of the cold-rolled steel sheets was performed under the condition listed in Table 3. In this manner, various non-oriented electrical steel sheets were manufactured. Thereafter, with respect to each of the non-oriented electrical steel sheets, the evaluations similar to those of Experimental example 1 were performed. These results are also listed in Table 3.

TABLE 3

| | CONDITION No. | STEEL No. | HOT-ROLLED SHEET ANNEALING | | FINISH ANNEALING | | |
| --- | --- | --- | --- | --- | --- | --- | --- |
| | | | SOAKING TEMPERATURE (° C.) | SOAKING TIME PERIOD (MIN) | SOAKING TEMPERATURE (° C.) | SOAKING TIME PERIOD (SEC) | COOLING RATE (° C./SEC) |
| INVENTIVE EXAMPLE | E1 | A11 | — | — | 950 | 30 | 20 |
| | E2 | A11 | — | — | 1100 | 30 | 30 |
| | E3 | A11 | — | — | 1000 | 20 | 20 |
| | E4 | A11 | — | — | 1000 | 30 | 2 |
| | E5 | A11 | — | — | 1000 | 30 | 50 |
| | E6 | A11 | — | — | 1000 | 30 | 20 |
| | E7 | A11 | 1000 | 1 | 1000 | 30 | 20 |
| COMPARATIVE EXAMPLE | F1 | A11 | — | — | 800 | 30 | 20 |
| | F2 | A11 | — | — | 1150 | 30 | 20 |
| | F3 | A11 | — | — | 1000 | 10 | 20 |
| | F4 | A11 | — | — | 1000 | 30 | 1 |
| | F5 | A11 | — | — | 1000 | 30 | 70 |

| | MECHANICAL PROPERTY TENSILE STRENGTH (MPa) | MAGNETIC PROPERTIES | | REMARKS |
| --- | --- | --- | --- | --- |
| | | W10/400 BEFORE AGING (W/kg) | W10/400 AFTER AGING (W/kg) | |
| INVENTIVE EXAMPLE | 560 | 22 | 22 | |
| | 550 | 18 | 17 | |
| | 560 | 19 | 19 | |
| | 580 | 20 | 19 | |
| | 560 | 21 | 21 | |
| | 570 | 19 | 19 | |
| | 560 | 18 | 18 | |
| COMPARATIVE EXAMPLE | 610 | 38 | 38 | IRON LOSS WAS LARGE. |
| | 500 | 18 | 18 | MECHANICAL STRENGTH WAS POOR. |
| | 550 | 35 | 36 | IRON LOSS WAS LARGE. |
| | 505 | 21 | 23 | MECHANICAL STRENGTH WAS POOR. |
| | 490 | 20 | 20 | MECHANICAL STRENGTH WAS POOR. PRODUCTIVITY WAS POOR IN FINISH ANNEALING. |

As listed in Table 3, in conditions No. E1 to No. E7 each falling within the range of the present invention, it was possible to obtain the tensile strength of 550 MPa or more and the core loss (W10/400) of 30 W/kg or less. On the other hand, in conditions No. F1 to No. F5 each falling outside the range of the present invention, it was difficult to achieve the tensile strength and the core loss.

Experimental Example 3

First, hot rolling of slabs made of the steels No. A11, No. A17, and No. B2 listed in Table 1 was performed to obtain hot-rolled steel sheets. The thickness of each of the hot-rolled steel sheets was set to 2.0 mm. Thereafter, pickling of each of the hot-rolled steel sheets was performed, and cold rolling of each of the hot-rolled steel sheets was performed to obtain cold rolling steel sheets. The thickness of each of the cold-rolled steel sheets was set to 0.35 mm. Subsequently, cold-rolled sheet annealing and finish annealing of each of the cold-rolled steel sheets were performed under the conditions listed in Table 4. In this manner, various non-oriented electrical steel sheets were manufactured. Thereafter, with respect to each of the non-oriented electrical steel sheets, the evaluations similar to those of Experimental example 1 were performed. These results are also listed in Table 4.

TABLE 4

| | | | HOT-ROLLED SHEET ANNEALING | | COLD-ROLLED SHEET ANNEALING | | | FINISH ANNEALING | |
|---|---|---|---|---|---|---|---|---|---|
| | CONDITION No. | STEEL No. | SOAKING TEMPERATURE (° C.) | SOAKING TIME PERIOD (MIN) | SOAKING TEMPERATURE (° C.) | SOAKING TIME PERIOD (SEC) | COOLING RATE (° C./SEC) | SOAKING TEMPERATURE (° C.) | SOAKING TIME PERIOD (MIN) |
| INVENTIVE EXAMPLE | G1 | A11 | — | | 950 | 30 | 25 | 550 | 30 |
| | G2 | A11 | — | | 1100 | 30 | 30 | 550 | 30 |
| | G3 | A11 | — | | 1000 | 20 | 25 | 550 | 30 |
| | G4 | A11 | — | | 1000 | 30 | 20 | 550 | 30 |
| | G5 | A11 | — | | 1000 | 30 | 25 | 420 | 30 |
| | G6 | A11 | — | | 1000 | 30 | 25 | 780 | 30 |
| | G7 | A17 | — | | 1000 | 30 | 25 | 550 | 10 |
| | G8 | A17 | — | | 1000 | 30 | 25 | 550 | 300 |
| | G9 | A17 | — | | 1000 | 30 | 25 | 550 | 30 |
| | G10 | A17 | — | | 1000 | 30 | 25 | 550 | 30 |
| | G11 | A17 | — | | 1000 | 30 | 25 | 550 | 30 |
| | G12 | A17 | 1000 | 1 | 1000 | 30 | 25 | 550 | 30 |
| COMPARATIVE EXAMPLE | H1 | A11 | — | | 900 | 30 | 25 | 550 | 30 |
| | H2 | A11 | — | | 1150 | 30 | 25 | 550 | 30 |
| | H3 | B2 | — | | 1000 | 10 | 25 | 550 | 30 |
| | H4 | B2 | — | | 1000 | 30 | 5 | 550 | 30 |
| | H5 | B2 | — | | 1000 | 30 | 25 | 380 | 30 |
| | H6 | B2 | — | | 1000 | 30 | 25 | 850 | 30 |
| | H7 | B2 | — | | 1000 | 30 | 25 | 550 | 5 |
| | H8 | B2 | — | | 1000 | 30 | 25 | 550 | 650 |
| | H9 | B2 | — | | 1000 | 30 | 25 | 550 | 30 |
| | H10 | B2 | — | | 1000 | 30 | 25 | 550 | 30 |

| | FINISH ANNEALING COOLING RATE (° C./SEC) | MECHANICAL PROPERTY TENSILE STRENGTH (MPa) | MAGNETIC PROPERTIES | | REMARKS |
|---|---|---|---|---|---|
| | | | W10/400 BEFORE AGING (W/kg) | W10/400 AFTER AGING (W/kg) | |
| INVENTIVE EXAMPLE | 0.03 | 570 | 22 | 22 | |
| | 0.03 | 560 | 21 | 21 | |
| | 0.03 | 570 | 19 | 19 | |
| | 0.03 | 560 | 21 | 22 | |
| | 0.03 | 550 | 23 | 24 | |
| | 0.03 | 570 | 19 | 19 | |
| | 0.03 | 680 | 22 | 21 | |
| | 0.03 | 690 | 22 | 24 | |
| | 0.0005 | 670 | 21 | 22 | |
| | 0.08 | 680 | 20 | 20 | |
| | 0.03 | 690 | 21 | 21 | |
| | 0.03 | 680 | 19 | 19 | |
| COMPARATIVE EXAMPLE | 0.03 | 600 | 28 | 29 | IRON LOSS WAS LARGE. |
| | 0.03 | 510 | 17 | 17 | MECHANICAL STRENGTH WAS POOR. |
| | 0.03 | 630 | 36 | 45 | IRON LOSS WAS LARGE. IRON LOSS DETERIORATED THROUGH AGING. |
| | 0.03 | 620 | 36 | 43 | IRON LOSS WAS LARGE. IRON LOSS DETERIORATED THROUGH AGING. |
| | 0.03 | 630 | 35 | 41 | IRON LOSS WAS LARGE. IRON LOSS DETERIORATED THROUGH AGING. |
| | 0.03 | 620 | 34 | 41 | IRON LOSS WAS LARGE. IRON LOSS DETERIORATED THROUGH AGING. |
| | 0.03 | 630 | 34 | 42 | IRON LOSS WAS LARGE. IRON LOSS DETERIORATED THROUGH AGING. |
| | 0.03 | 620 | 35 | 42 | IRON LOSS WAS LARGE. IRON LOSS DETERIORATED THROUGH AGING. |
| | 0.00005 | 620 | 36 | 45 | PRODUCTIVITY WAS POOR IN FINISH ANNEALIING. |

TABLE 4-continued

| | | | | IRON LOSS DETERIORATED THROUGH AGING. |
|---|---|---|---|---|
| | 1 | 620 | 36 | 45 | IRON LOSS WAS LARGE. IRON LOSS DETERIORATED THROUGH AGING. |

As listed in Table 4, in conditions No. G1 to No. G12 each falling within the range of the present invention, it was possible to obtain the tensile strength of 550 MPa or more and the core loss (W10/400) of 30 W/kg or less. On the other hand, in conditions No. H1 to No. H10 each falling outside the range of the present invention, it was difficult to achieve the tensile strength and the core loss.

Experimental Example 4

First, hot rolling of slabs made of the steels No. A11 and No. A17 listed in Table 1 was performed to obtain hot-rolled steel sheets. The thickness of each of the hot-rolled steel sheets was set to 2.0 mm. Thereafter, pickling of each of the hot-rolled steel sheets was performed, and cold rolling of each of the hot-rolled steel sheets was performed to obtain cold rolling steel sheets. The thickness of each of the cold-rolled steel sheets was set to 0.35 mm. Subsequently, cold-rolled sheet annealing (only conditions No. 17 and No. 14) and finish annealing of the cold-rolled steel sheets were performed under the conditions listed in Table 5. Then, an insulating film was formed on the surface of each of the cold-rolled steel sheets obtained after the finish annealing. In this manner, various non-oriented electrical steel sheets were manufactured.

Thereafter, from each of the non-oriented electrical steel sheets, 30 steel sheets each having a size in a rolling direction of 300 mm and a size in a direction perpendicular to the rolling direction of 60 mm were punched out. The steel sheet having such a shape and size is sometimes used for an actual motor core. Then, the 30 steel sheets were laminated to one another to obtain a laminate. Subsequently, annealing of each of the laminates was performed under the condition listed in Table 5. Then, a steel sheet for a test was extracted from each of the laminates, and with respect to this steel sheet, the evaluations similar to those of Experimental example 1 were performed. That is, the evaluation intended for a laminate used for a motor core was performed. These results are also listed in Table 5. Here, ones with the annealing condition deviating from the above-described favorable condition were each set as a comparative example.

Thereafter, from each of the non-oriented electrical steel sheets, 30 steel sheets each having a size in a rolling direction of 300 mm and a size in a direction perpendicular to the rolling direction of 60 mm were punched out. The steel sheet having such a shape and size is sometimes used for an actual motor core. Then, the 30 steel sheets were laminated to one another to obtain a laminate. Subsequently, annealing of annealing of each of the laminates was performed under the condition listed in Table 5. Then, a steel sheet for a test was extracted from each of the laminates, and with respect to this steel sheet, the evaluations similar to those of Experimental example 1 were performed. That is, the evaluation intended for a laminate used for a motor core was performed. These results are also listed in Table 5. Here, ones with the annealing condition deviating from the above-described favorable condition were each set as a comparative example.

TABLE 5

| | | | MANUFACTURING CONDITION OF NON-ORIENTED ELECTRICAL STEEL SHEET | | | | | | | |
|---|---|---|---|---|---|---|---|---|---|---|
| | | | HOT-ROLLED SHEET ANNEALING | | COLD-ROLLED SHEET ANNEALING | | | FINISH ANNEALING | | |
| | CONDITION No. | STEEL No. | SOAKING TEMPERATURE (° C.) | SOAKING TIME PERIOD (MIN) | SOAKING TEMPERATURE (° C.) | SOAKING TIME PERIOD (SEC) | COOLING RATE (° C./SEC) | SOAKING TEMPERATURE (° C.) | SOAKING TIME PERIOD (SEC) | COOLING RATE (° C./SEC) |
| INVENTIVE EXAMPLE | I1 | A11 | — | | — | — | — | 950 | 30 | 25 |
| | I2 | A11 | — | | — | — | — | 1100 | 30 | 25 |
| | I3 | A11 | — | | — | — | — | 1000 | 30 | 25 |
| | I4 | A11 | — | | — | — | — | 1000 | 30 | 25 |
| | I5 | A11 | — | | — | — | — | 1000 | 30 | 25 |
| | I6 | A11 | — | | — | — | — | 1000 | 30 | 55 |
| | I7 | A11 | — | | 1000 | 30 | 25 | 750 | 1800 | 0.03 |
| | I8 | A17 | — | | — | — | — | 1000 | 30 | 25 |
| | I9 | A17 | — | | — | — | — | 1000 | 30 | 25 |
| | I10 | A17 | — | | — | — | — | 1000 | 30 | 25 |
| | I11 | A17 | — | | — | — | — | 1000 | 30 | 25 |
| | I12 | A17 | — | | — | — | — | 1000 | 30 | 25 |
| | I13 | A17 | 1000 | 1 | — | — | — | 1000 | 30 | 25 |
| | I14 | A17 | — | | 1000 | 30 | 25 | 550 | 1800 | 0.03 |
| COMPARATIVE EXAMPLE | J1 | A17 | — | | — | — | — | 1000 | 30 | 25 |
| | J2 | A17 | — | | — | — | — | 1000 | 30 | 25 |
| | J3 | A17 | — | | — | — | — | 1000 | 30 | 25 |
| | J4 | A17 | — | | — | — | — | 1000 | 30 | 25 |
| | J5 | A17 | — | | — | — | — | 1000 | 30 | 25 |
| | J6 | A17 | — | | — | — | — | 1000 | 30 | 25 |

TABLE 5-continued

| | ANNEALING OF STACK | | | MECHANICAL | MAGNETIC PROPERTIES | | |
|---|---|---|---|---|---|---|---|
| | SOAKING TEMPERATURE (° C.) | SOAKING TIME PERIOD (MIN) | COOLING RATE (° C./SEC) | PROPERTY TENSILE STRENGTH (MPa) | W10/400 BEFORE AGING (W/kg) | W10/400 AFTER AGING (W/kg) | REMARKS |
| INVENTIVE EXAMPLE | 750 | 30 | 0.03 | 580 | 22 | 22 | |
| | 750 | 30 | 0.03 | 570 | 21 | 21 | |
| | 750 | 30 | 0.03 | 580 | 19 | 19 | |
| | 750 | 30 | 0.03 | 570 | 21 | 22 | |
| | 420 | 30 | 0.03 | 560 | 23 | 24 | |
| | 750 | 30 | 0.03 | 580 | 19 | 19 | |
| | 750 | 30 | 0.03 | 570 | 19 | 19 | |
| | 550 | 10 | 0.03 | 680 | 22 | 21 | |
| | 550 | 300 | 0.03 | 690 | 22 | 24 | |
| | 550 | 30 | 0.0008 | 670 | 21 | 22 | |
| | 550 | 30 | 0.08 | 680 | 20 | 20 | |
| | 550 | 30 | 0.03 | 690 | 21 | 21 | |
| | 550 | 30 | 0.03 | 680 | 19 | 19 | |
| | 550 | 30 | 0.03 | 680 | 20 | 20 | |
| COMPARATIVE EXAMPLE | 380 | 30 | 0.03 | 550 | 22 | 22 | MECHANICAL STRENGTH DID NOT IMPROVE SUFFICIENTLY. |
| | 850 | 30 | 0.03 | 520 | 21 | 22 | MECHANICAL STRENGTH WAS POOR. |
| | 750 | 1 | 0.03 | 560 | 22 | 23 | MECHANICAL STRENGTH DID NOT IMPROVE SUFFICIENTLY. |
| | 750 | 720 | 0.03 | 570 | 22 | 22 | PRODUCTIVITY WAS POOR IN ANNEALING OF STACK. |
| | 750 | 30 | 0.00001 | 560 | 21 | 22 | PRODUCTIVITY WAS POOR IN ANNEALING OF STACK. |
| | 750 | 30 | 1 | 510 | 22 | 23 | MECHANICAL STRENGTH WAS POOR. |

The annealing conditions, the magnetic property, and the mechanical property are listed in Table 5. From Table 5, it is found that the high strength and the low core loss are obtained simultaneously.

It should be noted that the above-described embodiment merely illustrates a concrete example of implementing the present invention, and the technical scope of the present invention is not to be construed in a restrictive manner by the embodiment. That is, the present invention may be implemented in various forms without departing from the technical spirit or main features thereof.

INDUSTRIAL APPLICABILITY

The present invention may be utilized in an industry of manufacturing electrical steel sheets and in an industry of utilizing electrical steel sheets such as motors, for example.

The invention claimed is:

1. A non-oriented electrical steel sheet comprising: in mass %,
   C: not less than 0.002% nor more than 0.01%;
   Si: not less than 2.0% nor more than 4.0%;
   Mn: not less than 0.05% nor more than 0.5%;
   Al: not less than 0.01% nor more than 3.0%; and
   at least one selected from the group consisting of Ti, V, Zr, and Nb,
   a balance being composed of Fe and inevitable impurities, wherein
   a value of a parameter Q represented by "Q=([Ti]/48+ [V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively,
   a matrix of a metal structure is a ferrite phase,
   the metal structure does not comprise a non-recrystallized structure,
   an average grain size of ferrite grains constituting the ferrite phase is not less than 30 μm nor more than 200 μm,
   a precipitate comprising at least one selected from the group consisting of Ti, V, Zr, and Nb exists with a density of 1 particle/μm$^3$ or more in the ferrite grain, and
   an average grain size of the precipitate is not less than 0.002 μm nor more than 0.2 μm.

2. The non-oriented electrical steel sheet according to claim 1, further comprising at least one selected from the group consisting of: in mass %,
   N: not less than 0.001% nor more than 0.004%;
   Cu: not less than 0.5% nor more than 1.5%; and
   Sn: not less than 0.05% nor more than 0.5%.

3. The non-oriented electrical steel sheet according to claim 2, wherein the precipitate is at least one selected from the group consisting of carbide, nitride, and carbonitride.

4. The non-oriented electrical steel sheet according to claim 1, wherein the precipitate is at least one selected from the group consisting of carbide, nitride, and carbonitride.

5. A laminate for a motor iron core comprising:
   non-oriented electrical steel sheets laminated to one another, wherein the non-oriented electrical steel sheets comprise: in mass %, C: not less than 0.002% nor more than 0.01%;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb, a balance being composed of Fe and inevitable impurities,
a value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively, a matrix of a metal structure is a ferrite phase, the metal structure does not comprise a non-recrystallized structure, an average grain size of ferrite grains constituting the ferrite phase is not less than 30 μm nor more than 200 μm, a precipitate comprising at least one selected from the group consisting of Ti, V, Zr, and Nb exists with a density of 1 particle/μm³ or more in the ferrite grain, and an average grain size of the precipitate is not less than 0.002 μm nor more than 0.2 μm.

6. The laminate for the motor iron core according to claim 5, wherein the non-oriented electrical steel sheets further comprising at least one selected from the group consisting of: in mass %, N: not less than 0.001% nor more than 0.004%;
Cu: not less than 0.5% nor more than 1.5%; and
Sn: not less than 0.05% nor more than 0.5%.

7. The laminate for a motor iron core according to claim 6, wherein the precipitate is at least one selected from the group consisting of carbide, nitride, and carbonitride.

8. The laminate for the motor iron core according to claim 5, wherein the precipitate is at least one selected from the group consisting of carbide, nitride, and carbonitride.

9. A manufacturing method of a laminate for a motor iron core comprising:

laminating non-oriented electrical steel sheets to one another to obtain a laminate; and performing annealing on the laminate under a condition in which a soaking temperature is not lower than 400° C. nor higher than 800° C., a soaking time period is not shorter than 2 minutes nor longer than 10 hours, and an average cooling rate from the soaking temperature to 300° C. is not less than 0.0001° C./sec nor more than 0.1° C./sec, wherein the non-oriented electrical steel sheets comprise: in mass %, C: not less than 0.002% nor more than 0.01%;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb, a balance being composed of Fe and inevitable impurities,
a value of a parameter Q represented by "Q=([Ti]/48+[V]/51+[Zr]/91+[Nb]/93)/([C]/12)" is not less than 0.9 nor more than 1.1, when contents of Ti, V, Zr, Nb, and C (mass %) are represented as [Ti], [V], [Zr], [Nb], and [C] respectively, a matrix of a metal structure is a ferrite phase, the metal structure does not comprise a non-recrystallized structure, an average grain size of ferrite grains constituting the ferrite phase is not less than 30 μm nor more than 200 μm, a precipitate comprising at least one selected from the group consisting of Ti, V, Zr, and Nb exists with a density of 1 particle/μm³ or more in the ferrite grain, and an average grain size of the precipitate is not less than 0.002 μm nor more than 0.2 μm.

10. The manufacturing method of the laminate for the motor iron core according to claim 9, wherein the non-oriented electrical steel sheets further contain at least one selected from the group consisting of: in mass %, N: not less than 0.001% nor more than 0.004%;
Cu: not less than 0.5% nor more than 1.5%; and
Sn: not less than 0.05% nor more than 0.5%.

11. The manufacturing method of the laminate for the motor iron core according to claim 10, wherein the precipitate is at least one selected from the group consisting of carbide, nitride, and carbonitride.

12. The manufacturing method of the laminate for the motor iron core according to claim 9, wherein the precipitate is at least one selected from the group consisting of carbide, nitride, and carbonitride.

\* \* \* \* \*